E. SMITH.
Meat and Vegetable Chopper.

No. 63,566.          Patented April 2, 1867.

Witnesses:
F. A. Lehmann
A. H. Yeatman

Inventor:
Eli Smith
Per Alexander &c
Atty

United States Patent Office.

ELI SMITH, OF CLAREMONT, NEW HAMPSHIRE.

Letters Patent No. 63,566, dated April 2, 1867.

IMPROVED MEAT AND VEGETABLE CHOPPER.

The Schedule referred to in these Letters Patent and making part of the same.

TO ALL WHOM IT MAY CONCERN:

Be it known that I, ELI SMITH, of Claremont, in the State of New Hampshire, have invented certain new and useful Improvements in Meat or Vegetable Choppers; and I do hereby declare that the following is a clear, full, and exact description of the same, reference being had to the annexed drawings, and to the letters of reference marked thereon, as forming a part of this specification, in which—

Figure 3:
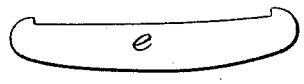

Figure 3, a view of one of the knives or choppers exhibiting the form in which it is designed to make them.

The nature of my invention consists in the formation of the sides or holders, also in the construction of the choppers, and combining them in the manner and for the purpose hereinafter stated.

Figure 1:
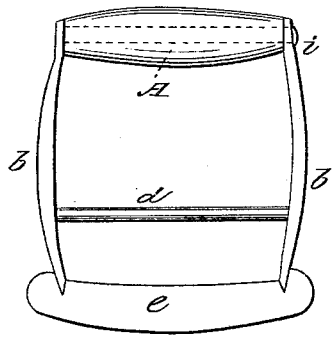
Figure 1 is a side elevation.
Figure 2:
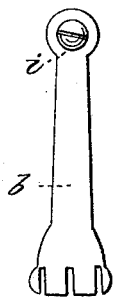
Figure 2 is a view of one of the sides showing their mode of construction.

In fig. 1, A represents the handle, provided with a hole from end to end, through which the bolt or screw $i$ passes, the object of which will be more fully appreciated hereafter. $b\ b$ represent the sides or holders, the lower ends of which are flared or widened so they will admit of three or more slots being cut vertically through them, as shown in fig. 2. $e\ e$ are the choppers or knives, formed with a slight hook on the upper side of each end, as represented in fig. 3. $d$ is a loose rod or support placed a short distance above the choppers between the sides $b\ b$. Said rod is held in proper position by means of indentations on the inner surface of sides. Thus it will be observed that when the knives or choppers are properly adjusted in the slots, and the tops of the sides $b\ b$ are brought closer together by means of the bolt or screw, the bottoms of the sides are pressed out, thereby firmly securing the knives, as fully seen in fig. 1.

Having thus fully described my invention, what I claim, and desire to secure by Letters Patent, is—

The sides $b\ b$, as constructed, in combination with knives or choppers $e\ e\ e$, rod $d$, and handle A, as and for the purpose set forth.

In testimony that I claim the foregoing as my own, I hereby affix my signature in the presence of two witnesses.

ELI SMITH.

Witnesses:
F. F. HASKELL,
GEO. T. STOCKWELL.